(12) United States Patent
Maier et al.

(10) Patent No.: US 7,278,222 B2
(45) Date of Patent: Oct. 9, 2007

(54) METHOD FOR MEASURING A PROGRAM-CONTROLLED MACHINE TOOL

(75) Inventors: Marzell Maier, Isny (DE); Rolf Kettemer, Leuterschach (DE)

(73) Assignee: Deckel Maho Pfronten GmbH, Pfronten (DE)

( * ) Notice: Subject to any disclaimer, the term of this patent is extended or adjusted under 35 U.S.C. 154(b) by 0 days.

(21) Appl. No.: 11/356,586

(22) Filed: Feb. 16, 2006

(65) Prior Publication Data

US 2006/0201010 A1 Sep. 14, 2006

(30) Foreign Application Priority Data

Feb. 22, 2005 (DE) ............. 10 2005 008 055

(51) Int. Cl.
*G01C 25/00* (2006.01)

(52) U.S. Cl. .......................................... 33/502
(58) Field of Classification Search .......... 33/502; 73/1.79

See application file for complete search history.

(56) References Cited

U.S. PATENT DOCUMENTS 4,962,591 A * 10/1990 Zeller et al. ............... 33/502
5,187,874 A * 2/1993 Takahashi et al. .......... 33/502
5,813,128 A * 9/1998 Bailey ...................... 33/502
6,023,850 A * 2/2000 Trapet ...................... 33/502
6,112,423 A * 9/2000 Sheehan .................... 33/502
6,748,790 B2 * 6/2004 Abbe ......................... 73/1.79
7,055,367 B2 * 6/2006 Hajdukiewicz et al. ...... 73/1.79

FOREIGN PATENT DOCUMENTS

DE 31 32383 C2 3/1983

OTHER PUBLICATIONS

Weck, Manfred, Werkzeugmachinen, Fertigungssysteme, Band 4 VDI Verlag, Düsseldorf, 1992, Seiten 145 bis 157 und 165 bis 169.

* cited by examiner

*Primary Examiner*—Christopher W Fulton
(74) *Attorney, Agent, or Firm*—The Maxham Firm

(57) ABSTRACT

A method for measuring a program-controlled machine tool using a measuring sphere. According to this method the measuring sphere having known dimensions is positioned on a machine part. A sensing element installed in the machine is moved to a selected initial position in which it is located approximately 10 mm above the vertex section of the sphere. Then the sensing element is repeatedly moved until it contacts various points on the surface of the sphere, and the coordinate values of those points of contact are input into the controller. Thereafter the spatial position of the center of the sphere is calculated and compared with target values stored in the controller.

2 Claims, 2 Drawing Sheets

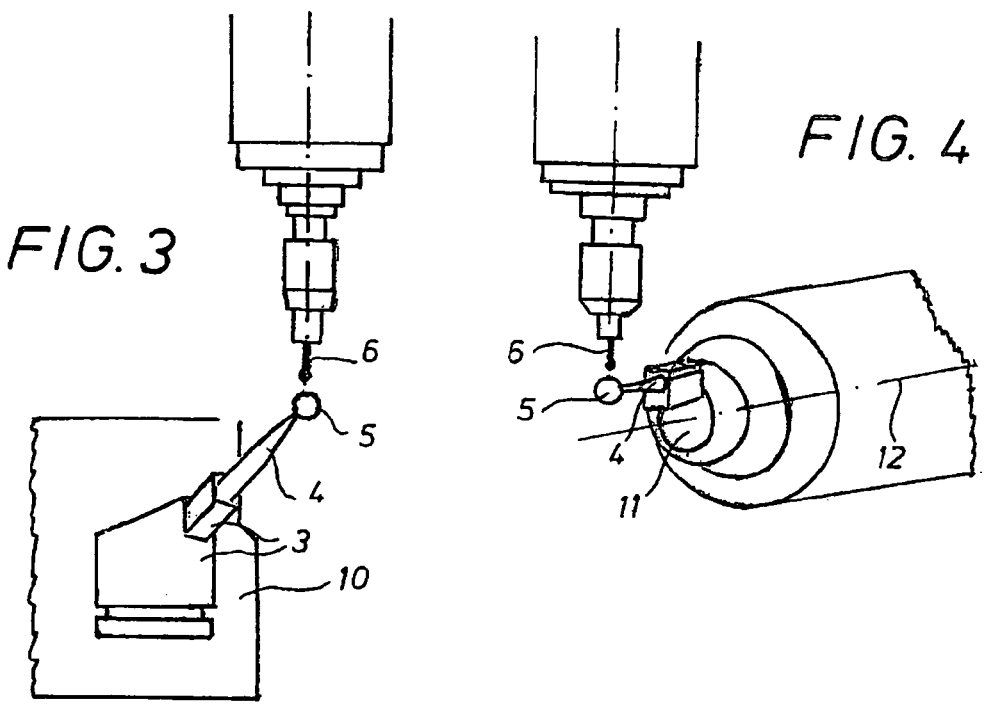
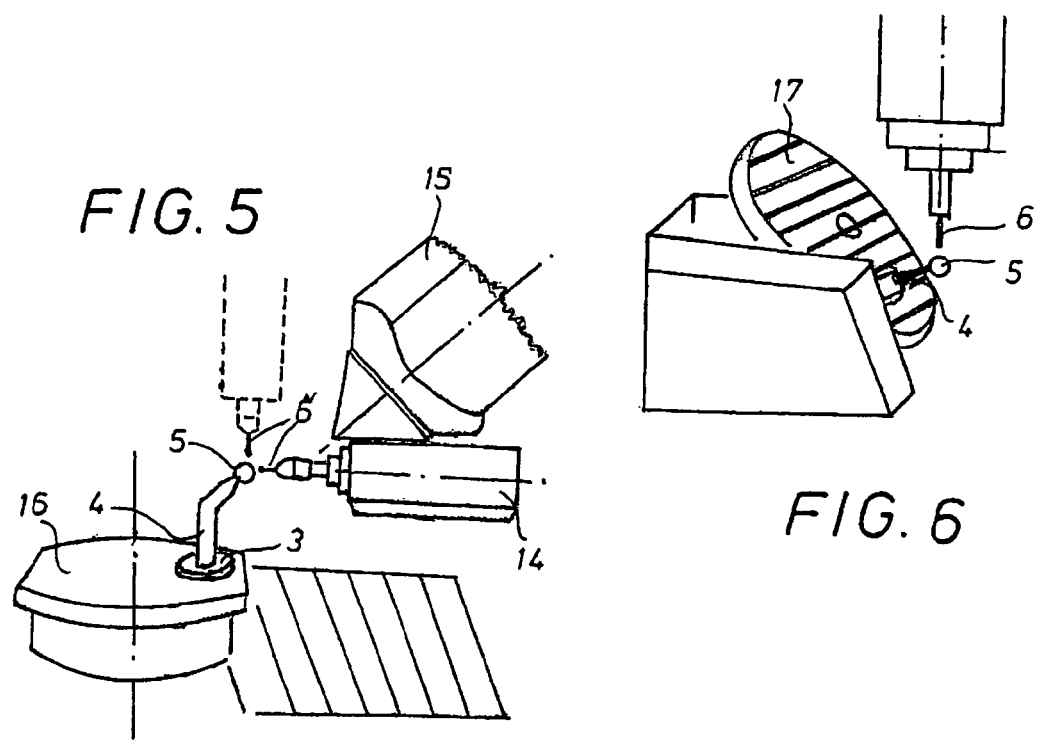

METHOD FOR MEASURING A PROGRAM-CONTROLLED MACHINE TOOL

BACKGROUND

1. Field of the Invention

The invention relates to a method for measuring a program-controlled machine tool using a measuring sphere.

2. Background Discussion

To comply with the high accuracy requirements of modern machine tools an accurate measurement of the individual machine components during the production process and of the whole machine after its production is indispensable so that possible defects can be detected in an early stage and compensated for by corresponding corrective measures, if required. After certain periods of operation further measurements are necessary to detect and analyze the state of wear of individual machine components as well as defects caused by improper handling.

For the purposes mentioned above various measuring methods are known with the aid of which, for example, the pivot length, the displacement of the axis of a spindle head or a round turntable, as well as the slack, can be detected by special measurement programs. To carry out the individual measuring operations in milling and drilling machines, one method employs a sensing element mounted in the work spindle which is used in connection with a polished block clamped to the machine part to be measured, particularly the workpiece table. Such measuring methods are extremely time-consuming and require numerous rectification and measuring operations.

For measuring the rotational axes of a milling machine, for example, of milling heads of various types, a method referred to as FIDIA head measuring system is known in which a special calibration and measuring device is used. With this known measuring method a positioning error compensation for the two round axes as well as the automatic detection of their zero point can be carried out. In addition, an examination of the parallelism of the rotational planes of the round axes with respect to the linear axes, as well as an extended volumetric compensation, can be carried out. The calibration and measuring device required to accomplish this method comprises a stator to be mounted on the machine part, for example, the machine table, and includes three struts angularly displaced by 120° and carrying sensing elements positioned in a predetermined angle of inclination at their upper ends. A measuring tool comprising a cylindrical shaft and a measuring sphere disposed at its free end is mounted in the work spindle of the machine. The measuring sphere is positioned by corresponding movements of the work spindle so that all three sensing elements contact the surface of the sphere. This known measuring method is also connected with certain expenditures since relatively complex calibration and measuring devices are required.

German patent 31 32 383 C describes a device and a method for testing the measuring accuracy of coordinate measuring devices. Two measuring spheres machined with a high surface quality are disposed on a common carrier in an adjustable spacing and provided with bores along a measuring beam. Changes of the distance between the spheres are measured by an interferometer arrangement. The exact original distance between the two measuring spheres needs to be known. The spatial position of the two measuring spheres can be detected by the coordinate measuring device by means of a multiple point sampling. A control computer detects and compares the distance values of the measuring spheres detected by the laser interferometer and the values measured by the coordinate measuring device during the sampling of the spheres. Measuring machine tools, particularly the round axes, is not possible.

SUMMARY OF THE INVENTION

It is a purpose of the invention to provide a method for measuring a program-controlled machine tool enabling a rapid and highly accurate measurement of various machine components before and, if required, during the operation of the machine with little technical expenditure.

A measuring sphere having previously known dimensions can be positioned on a selected machine part in a simple way by fastening a mounting device with a simple construction, for example, in the form of a rod, to the measuring sphere, and by mounting the mounting device on the machine part using conventional clamping means. After the measuring sphere has been mounted on the machine part its position is determined with the aid of a conventionally designed sensing element mounted in the work spindle of a milling machine to be measured. The sensing element is moved to an initial position estimated by a user in which it is located about 5 to 20 mm above the vertex of the measuring sphere. Then the measuring program integrated in the program control of the machine is started. While the program is executed the sensing element is repeatedly and preferably vertically moved with a successive lateral displacement until it contacts different points on the surface of the sphere. The respective positions of the surface points are detected and the values are used to calculate the spatial position of the center of the sphere using commonly known geometrical relationships. By using the measuring sphere as a measuring body a considerable simplification of the required measuring operations is obtained since spatial data are obtained by a simple measurement of the surface of the sphere due to the fixed geometrical relationships of a sphere, which offers considerable advantages as compared to the conventional, generally two-dimensional, measuring methods. Due to the predetermined geometrical relationships between the center and the outer surface of a sphere, for example, positional deviations of a point can not only be detected in the horizontal plane but also in the vertical plane employing the method according to the invention.

To detect the positional deviations of the round axes and possibly the linear axes of a machine, individually or together, the method according to the invention is carried out by moving the respective machine part on which the measuring sphere is mounted via its mounting device by a predetermined distance after the first determination of the spatial position of the center of the sphere. In the thus obtained second position the spatial position of the center of the sphere is determined again by point sampling of the surface of the sphere from the new position. Since the moving distance of the machine part moved is known the spatial positions of the center of the sphere detected in the first and the second measuring cycle can be compared with corresponding target values of the machine control to determine positional deviations.

To measure the spatial position of an axis of rotation of, for example, a pivotable round table, a machine part or the like, the machine part including the measuring sphere fixed thereto is preferably rotated about the common axis of rotation by a predetermined angle from a first measuring position to a second measuring position. The spatial position of the center of the sphere is determined in the way described above in the first as well as in the second measuring position. Since the measuring sphere itself as well as the radial length of the mounting device of the measuring sphere are known, the position of the center of rotation of the respective axis can be accurately calculated based on those two measurements of the spatial position of the center of the sphere. This method is particularly advantageous if detachable NC machine parts are used, the position and orientation of which on the table have so far only been determined with the aid of groove stones provided for this purpose, which lead to inaccuracies and wobbling motions of an axis of rotation about a main coordinate axis.

Calibration spheres with straight or offset mounting devices as well as fixation elements of various types are available in different embodiments and can be individually assembled for each machine type.

With the method according to the invention using the calibration or measuring spheres, all round axes of a machine tool can be measured by only one sensing element since the center of rotation can be accurately detected not only in the axial direction of a round axis but also in the radial direction with only one calibration sphere. The centers of rotation of those axes could previously not be accurately measured with the aid of sensing elements. In addition to the detection of the center of rotation, a wobbling motion of the round axis can be measured with the method according to the invention. An extension of the measuring program enables the separate detection of a wobbling motion of the axis about both planes. In case of universal milling and drilling machines having a C axis, that is, an NC round table, the method according to the invention enables horizontal measurements so that the machine kinematics can be controlled even with bulky workpieces mounted thereon.

An important advantage of the measuring method according to the invention is that the calibration and measuring sphere can be positioned almost arbitrarily in space on a selected machine part using various suitable mounting devices. An exact positioning of the mounting devices on the respective machine part is not required. To fix the mounting devices on the machine part suitable magnetic mounting devices may be used instead of mechanical means.

BRIEF DESCRIPTION OF THE DRAWING

The objects, features, and advantages of the method according to the invention will be more clearly perceived from the following detailed description, when read in conjunction with the accompanying drawing, in which:

FIG. 3 shows the execution of the method of the invention using a measuring sphere fixed to an inclined mounting device;

FIG. 4 shows the execution of the method of the invention with the measurement of a horizontal axis of rotation;

FIG. 5 shows the execution of the method of the invention using a pivotable head; and FIG. 6 shows the execution of the method of the invention using a pivotable round table.

DETAILED DESCRIPTION OF THE PREFERRED EMBODIMENTS

Figures 1, 2:
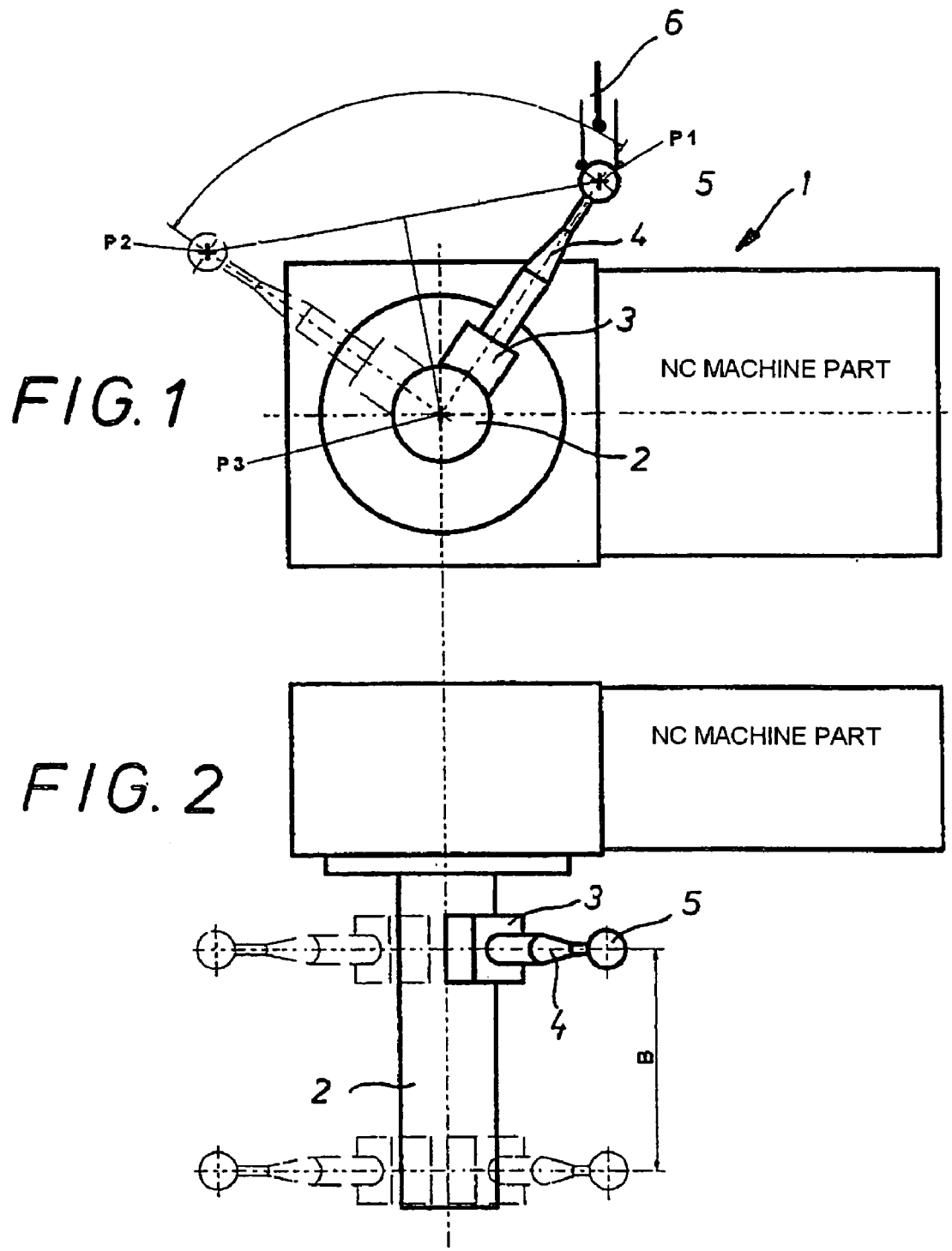
FIG. 1 is a schematic front view of the measurement of the center of rotation of a machine part according to the invention.
FIG. 2 is a schematic plan view of the machine part according to FIG. 1.

With reference not to the drawing, FIG. 1 shows a machine part 1 mounted in an arbitrary position on a workpiece table (not shown). Center of rotation P3 of the machine part 1 is to be determined. To this end mounting device 3 fixedly connected to cone-shaped cylinder pin 4 in the radial direction is attached to shaft 2, for example, by means of a magnetic force. An extremely accurately machined measuring sphere 5 of known dimensions is mounted on the end of pin 4.

At the start of the measuring process sensing element 6 mounted in the work spindle of the milling machine is moved to an initial position in which the head of sensing element 6 is located approximately 10 mm above the vertex section of measuring sphere 5. From the initial position the machine tool spindle (not shown) is moved vertically downwardly until the head of sensing element 6 contacts the surface of the sphere. Since the diameter of the sphere is known the spatial position P1 of the center of the sphere can be calculated using the measured values. Then shaft 2 of the machine part is rotated by an angle $\alpha$ so that radially aligned mounting device 3, 4, together with sphere 5, are moved to the position shown by broken lines in FIG. 1. In this position the measuring sphere is again repeatedly sampled by sensing element 6, and spatial position P2 of the center of the sphere is determined based on the measured values. Since the length of mounting device 3, 4 is known, the center of rotation P3 can be determined from detected spatial positions P1, P2.

In case of the measuring arrangement shown in FIG. 2, the mounting device on shaft 2 is axially moved by a distance B after the first measuring operation described above, and then the measuring operation described above is repeated. In this way a wobbling of shaft 2 can be detected.

In the embodiments shown in FIGS. 3 to 6, the respective measurements are carried in the manner described above. The spatial position of the center of the sphere is detected by a repeated sampling of the sphere. The respectively obtained measurement values as well as the calculated spatial positions of the sphere centers are stored in a special subprogram of the machine control (not shown) which also carries out the respectively required calculations.

As can be seen in FIGS. 3 to 6, the measuring sphere may be attached to various types of mounting devices, the respective dimensions of which are known. Different machine parts, particularly the spatial position of their centers of rotation, can be measured in a simple manner using a suitable mounting device. According to FIG. 3, inclined mounting device 3, 4 is mounted on translatively movable workpiece table 10 and is used for measuring sphere 5.

According to FIG. 4, measuring sphere 5 is excentrically mounted on mounting device 3, 4 in a chuck rotatable about horizontal axis 12 by means of a motor.

According to FIG. 5, bent mounting device 3, 4 is used, which is mounted on workpiece table 16 rotatable about vertical axis 13.

The sensing element is mounted in work spindle 14 which can be pivoted from its horizontal position shown by solid lines to its vertical position shown by broken lines by means of pivoting head 15.

According to FIG. 6, mounting device 4, which includes the measuring sphere, is mounted on round table 17 pivotable about a horizontal axis by means of a motor. With the measurements according to the invention the swivel axis of the round table as well as its axis of rotation passing through the center can be measured.

The method according to the invention requires no separate measuring devices and can be carried out within a very short period of time even by inexperienced personnel. This is particularly advantageous in that the machine can be measured in situ, that is, on the premises of the user which considerably facilitates inspections by the manufacturer and enables an early detection of possible defects.

What is claimed is:

1. A method for measuring a program-controlled machine tool using a measuring sphere, the machine tool having a controller with stored target values, the method comprising:

positioning a measuring sphere on a machine part of the machine tool;

moving a sensing element installed in the machine tool to a selected initial position;

repeatedly moving the sensing element until it contacts various points on the surface of the sphere;

calculating the spatial position of the center of the sphere based on the obtained measurement values;

moving the machine part with the measuring sphere attached to it by a predetermined distance α after the first determination of the spatial position of the center of the sphere;

again determining the position of the center of the sphere by point sampling of the surface of the sphere;

determining a positional deviation by comparing the actual values of the spatial position of the center of the sphere detected in the respective measuring cycle with corresponding target values from the controller; and comparing the calculated spatial position of the center of the sphere with the target values stored in the controller.

2. The method according to claim 1, and further comprising pivoting by a predetermined angle α from a first measuring position to a second measuring position the machine part including the measuring sphere for measuring the spatial position of an axis of rotation.

* * * * *

UNITED STATES PATENT AND TRADEMARK OFFICE
CERTIFICATE OF CORRECTION

| | | |
|---|---|---|
| PATENT NO. | : 7,278,222 B2 | Page 1 of 1 |
| APPLICATION NO. | : 11/356586 | |
| DATED | : October 9, 2007 | |
| INVENTOR(S) | : Maier | |

It is certified that error appears in the above-identified patent and that said Letters Patent is hereby corrected as shown below:

Title Page, Item (12) delete "Maier et al." and insert --Maier--.

Title Page, Item (75) Inventors:

should read

--(75) Inventor: Marzell Maier, Isny (DE) --.

Signed and Sealed this
Thirteenth Day of October, 2015

Michelle K. Lee
*Director of the United States Patent and Trademark Office*